(12) United States Patent
Hsu et al.

(10) Patent No.: US 9,196,989 B2
(45) Date of Patent: Nov. 24, 2015

(54) BATTERY CONNECTOR FOR ELECTRONIC DEVICE

(71) Applicant: Chi Mei Communication Systems, Inc., New Taipei (TW)

(72) Inventors: Wei-Chih Hsu, New Taipei (TW); Pen-Uei Lu, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 88 days.

(21) Appl. No.: 13/923,926

(22) Filed: Jun. 21, 2013

(65) Prior Publication Data

US 2014/0051299 A1    Feb. 20, 2014

(30) Foreign Application Priority Data

Aug. 17, 2012  (CN) .......................... 2012 1 02937950

(51) Int. Cl.
*H01R 3/00* (2006.01)
*H01R 13/04* (2006.01)
*H01R 13/05* (2006.01)
*H01M 2/10* (2006.01)

(52) U.S. Cl.
CPC ................ *H01R 13/04* (2013.01); *H01R 13/05* (2013.01); *H01M 2/1022* (2013.01)

(58) Field of Classification Search
CPC ............................ H01R 13/2442; H01R 13/22
USPC .......................................... 439/500, 862, 289
See application file for complete search history.

(56) References Cited

U.S. PATENT DOCUMENTS

| | | | | |
|---|---|---|---|---|
| 5,259,769 A | * | 11/1993 | Cruise et al. | 439/65 |
| 6,068,519 A | * | 5/2000 | Lok | 439/660 |
| 6,568,943 B2 | * | 5/2003 | Okayasu et al. | 439/76.1 |
| 6,994,576 B2 | * | 2/2006 | Tanaka et al. | 439/188 |
| 7,575,469 B1 | * | 8/2009 | Hung | 439/500 |
| 7,871,290 B2 | * | 1/2011 | Lou | 439/500 |

FOREIGN PATENT DOCUMENTS

| | | |
|---|---|---|
| JP | 2004087135 A | 3/2004 |
| JP | 2007280702 A | 10/2007 |

* cited by examiner

*Primary Examiner* — Phuong Dinh
(74) *Attorney, Agent, or Firm* — Novak Druce Connolly Bove + Quigg LLP

(57) ABSTRACT

A battery connector for a battery of a portable electronic device includes an insulation body and a plurality of elastic pins. Each elastic pin includes a mounting portion, a buffering portion, and a contacting portion connected to each other. The mounting portion is secured on the insulation body, the contacting portion is perpendicularly connected to the buffering portion. The elastic pins are positioned on the insulation body, and the contacting portions correspondingly are assembled in the grooves.

4 Claims, 5 Drawing Sheets

BATTERY CONNECTOR FOR ELECTRONIC DEVICE

BACKGROUND

1. Field of the Disclosure

The present disclosure relates to a battery connector for an electronic device.

2. Description of Related Art

A battery for a widely used portable electronic device has a plurality of exposed metallic terminals. Corresponding conductive connectors are generally installed in a receiving cavity of the portable electronic device. The conductive connectors inside the receiving cavity tightly contact the exposed terminals.

Since the battery often needs to be assembled or disassembled to the receiving cavity, the conductive connectors have to be pressed by the metallic terminals. The conductive connectors are easily to be damaged.

Therefore, there is room for improvement within the art.

BRIEF DESCRIPTION OF THE DRAWINGS

Many aspects of the present battery connector for an electronic device can be better understood with reference to the following drawings. The components in the various drawings are not necessarily drawn to scale, the emphasis instead being placed upon clearly illustrating the principles of the present battery connector for an electronic device. Moreover, in the drawings, like reference numerals designate corresponding parts throughout the diagrams.

DETAILED DESCRIPTION OF THE EMBODIMENT

Figure 1:
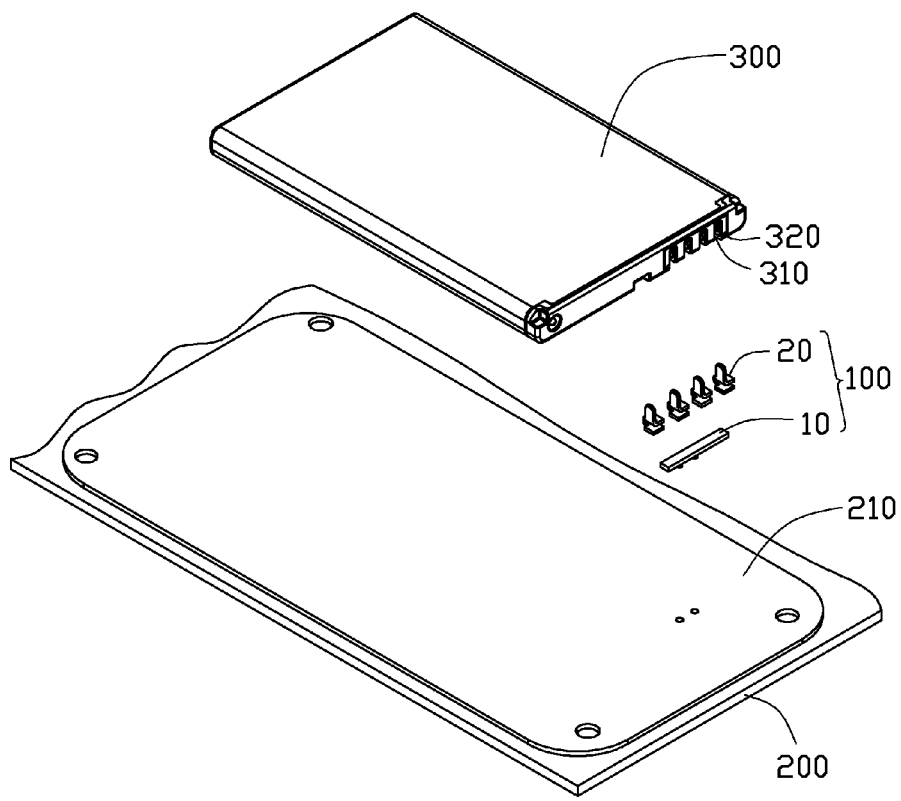
FIG. 1 is an exploded schematic view of an electronic device including a battery connector and a battery, according to an exemplary embodiment.

FIG. 1 shows an exemplary battery connector 100 for electronic devices 200, such as mobile phones, personal digital assistants, digital cameras, for example. The electronic device 200 comprises a printed circuit board 210 and a battery 300. The battery connector 100 comprises an insulation body 10 and a plurality of elastic pins 20 arranged in parallel in the insulation body 10. The battery connector 100 is mounted on the printed circuit board 210 and is electronically connected to the battery 300. The battery 300 defines a plurality of grooves 310. Each of opposite inner walls of each groove 310 has a contact 320.

Figure 2:
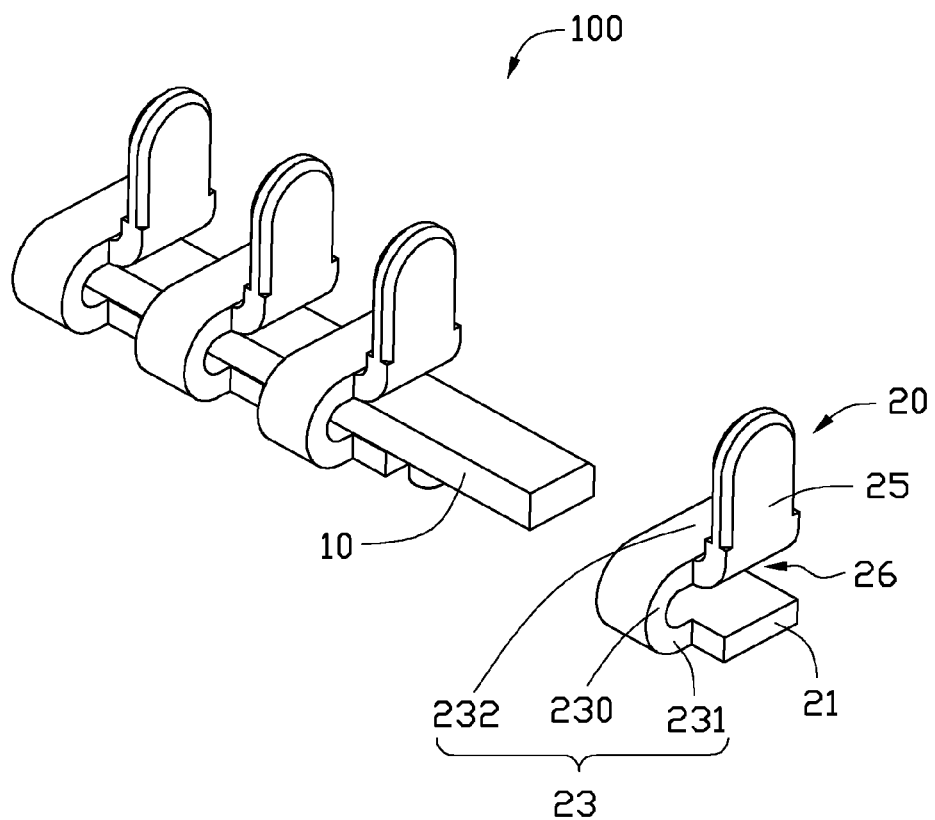
FIG. 2 is an enlarged view of the battery connector shown in FIG. 1.

FIG. 2 shows that the insulation body 10 is substantially a flat plate and is used for supporting the elastic pins 20. Each elastic pin 20 comprises a mounting portion 21, a buffering portion 23 and a contacting portion 25 connected to each other. The mounting portion 21 is configured for being secured on the insulation body 10. The buffering portion 23 has an arcuate portion 230, a first connecting end 231 and a second connecting end 232. The arcuate portion 230 is positioned between the first connecting end 231 and the second connecting end 232. The first connecting end 231 is connected to the mounting portion 21, and the second connecting end 232 is connected to the contacting portion 25. The second connecting end 232 is longer than the first connecting end 231 and is parallel to the mounting portion 21. A space 26 is defined between the second connecting end 232 and the mounting portion 21. The contacting portion 25 is perpendicularly positioned at one side of the second connecting end 232 for electronically connecting the contacts 320.

Figure 3:
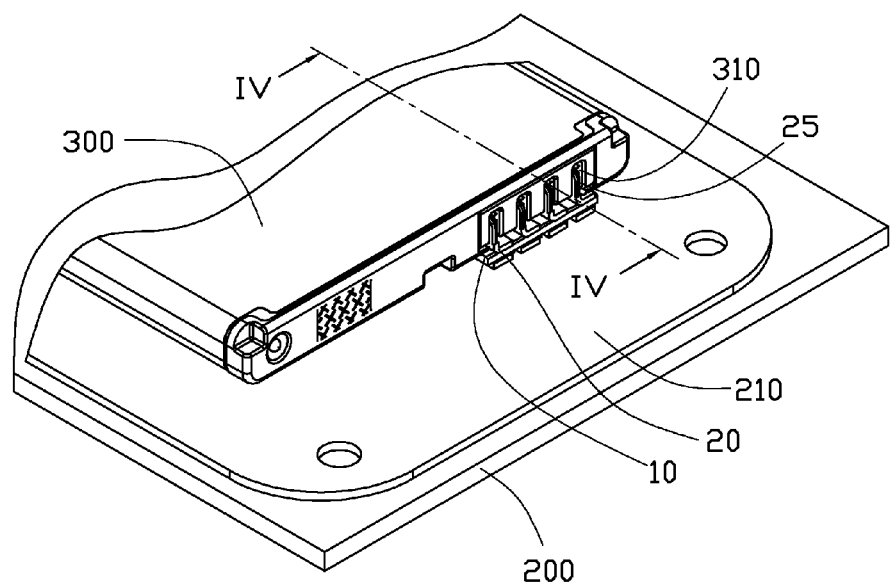
FIG. 3 is an assembled view of the electronic device, showing the battery connector engaged with the battery shown in FIG. 1.
Figure 4:
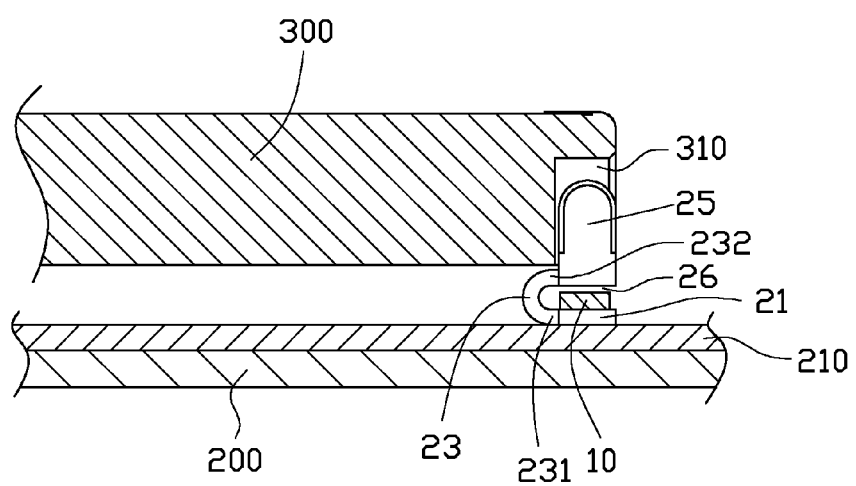
FIG. 4 is a cross sectional view of the electronic device taken along line IV-IV.

FIGS. 3 and 4 show that the mounting portion 21 is secured on one side of the insulation body 10, and the second connecting end 232 and the contacting portion 25 are positioned on an opposite side of the insulation body 10 to allow the insulation body 10 to be received in the space 26. The second connecting end 232 is spaced from the insulation body 10. In this exemplary embodiment, the mounting portion 21 is secured on the insulation body 10 via hot melting. Then, the insulation body 10 is welded on the printed circuited board 210.

Figure 5:
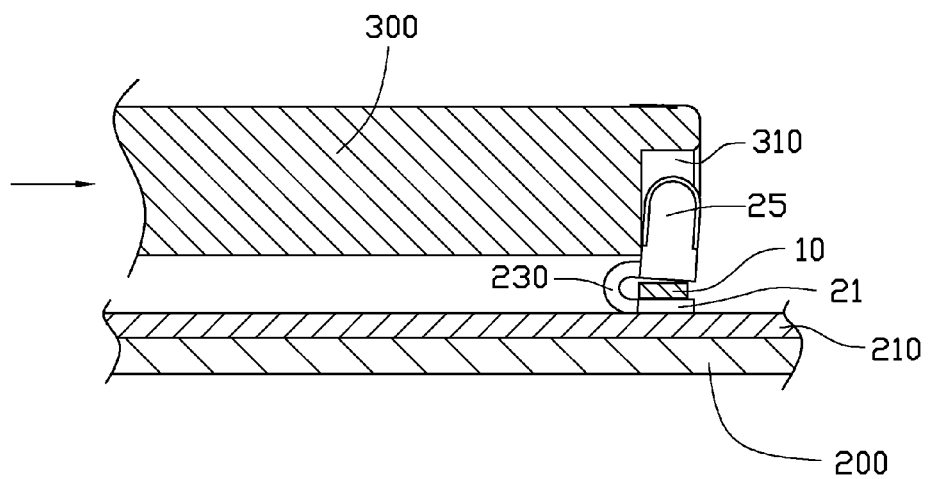
FIG. 5 is similar to FIG. 4, but showing the battery in an impacted state.

FIG. 4 shows that when the battery 300 is engaged with the battery connector 100, the contacting portions 25 are respectively received in the grooves 310. Each contacting portion 25 is clamped by two opposite contacts 320 in the groove 310. Thus, the battery connector 100 is electronically connected to the battery 300. FIG. 5 shows that when the battery 300 is suffered to a force applied on the contacting portions 25, the arcuate portion 230 of the buffering portion 23 will be deformed to allow the second connecting end 232 to move toward the space 26. Thus, the impacted force applied on the contacting portions 25 can be buffered by the buffering portion 23 for protecting the contacting portions 25. Additionally, the buffering portion 23 can automatically resume the contacting portions 25 to an original position. The present battery connector 100 has a simple structure and is easily to be assembled on the electronic device 200.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A battery connector for a battery of a portable electronic device, the battery defining a plurality of grooves, comprising:
   an insulation body; and
   a plurality of elastic pins; each elastic pin comprising a mounting portion, a buffering portion, and a contacting portion connected to each other; the mounting portion being secured on the insulation body; the buffering portion defining a space; the insulation body received in the space; and the contacting portion being perpendicularly connected to the buffering portion;
   wherein the plurality of elastic pins are positioned on the insulation body, the contacting portions correspondingly are assembled in the plurality of grooves;
   the buffering portion comprises an arcuate portion, a first connecting end, and a second connecting end; the arcuate portion is positioned between the first connecting end and the second connecting end; the first connecting end is connected to the mounting portion; and the second connecting end is connected to the contacting portion;

the second connecting end is longer than the first connecting end and is parallel to the mounting portion, and a space is defined between the second connecting end and the mounting portion.

2. The battery connector as claimed in claim 1, wherein the insulation body is substantially a flat plate and is used for supporting the plurality of elastic pins.

3. A portable electronic device, comprising:

a printed circuit board;

a battery with a plurality of grooves; and a battery connector mounted on the printed circuit board, the battery connector comprising:

an insulation body; and a plurality of elastic pins positioned on the insulation body, each elastic pin including a mounting portion, a buffering portion, and a contacting portion connected to each other; the mounting portion being secured on the insulation body; the buffering portion defining a space; the insulation body received in the space; and the contacting portion being perpendicularly connected to the buffering portion;

wherein the insulation body is mounted on the printed circuit board, each contacting portion correspondingly is assembled in one of the plurality of grooves;

the buffering portion comprises an arcuate portion, a first connecting end and a second connecting end; the arcuate portion is positioned between the first connecting end and the second connecting end; the first connecting end is connected to the mounting portion; and the second connecting end is connected to the contacting portion;

the second connecting end is longer than the first connecting end and is parallel to the mounting portion, and a space is defined between the second connecting end and the mounting portion.

4. The portable electronic device as claimed in claim 3, wherein the insulation body is substantially a flat plate and is used for supporting the plurality of elastic pins.

* * * * *